(12) United States Patent
Beldycki

(10) Patent No.: US 7,409,135 B1
(45) Date of Patent: Aug. 5, 2008

(54) FIBER OPTIC FERRULE

(76) Inventor: Wojciech Beldycki, 936 Riviera St., Venice, FL (US) 34285

( * ) Notice: Subject to any disclaimer, the term of this patent is extended or adjusted under 35 U.S.C. 154(b) by 0 days.

(21) Appl. No.: 11/731,288

(22) Filed: Mar. 30, 2007

Related U.S. Application Data

(63) Continuation-in-part of application No. 11/593,828, filed on Nov. 7, 2006.

(51) Int. Cl.
*G02B 6/00* (2006.01)

(52) U.S. Cl. .......................... 385/134; 385/53; 385/60; 385/81; 385/136; 385/137

(58) Field of Classification Search ................. 385/53, 385/60, 81, 92, 134, 136, 137
See application file for complete search history.

(56) References Cited

U.S. PATENT DOCUMENTS

| | | | |
|---|---|---|---|
| 4,127,319 A | 11/1978 | Forney, Jr. et al. | |
| 4,190,317 A | 2/1980 | Makuch | |
| 4,261,774 A | 4/1981 | Lewis et al. | |
| 4,440,471 A | 4/1984 | Knowles | |
| 4,447,121 A | 5/1984 | Cooper et al. | |
| 4,458,983 A | 7/1984 | Roberts | |
| 4,519,672 A | 5/1985 | Rogstadius | |
| 4,781,430 A | 11/1988 | Tanaka | |
| 4,813,760 A | 3/1989 | Tanaka et al. | |
| 4,936,662 A | 6/1990 | Griffin | |
| 5,018,819 A | 5/1991 | Schmidt | |
| 5,088,804 A | 2/1992 | Grinderslev | |
| 5,305,406 A | 4/1994 | Rondeau | |
| 5,341,447 A | 8/1994 | Edwards et al. | |
| 5,381,500 A | 1/1995 | Edwards et al. | |
| 5,502,784 A | 3/1996 | Rondeau | |
| RE35,734 E | 2/1998 | Rondeau | |
| 5,822,483 A | 10/1998 | Rondeau | |
| RE36,231 E * | 6/1999 | Rondeau | 385/81 |
| 6,000,857 A | 12/1999 | Rondeau | |
| 6,510,271 B1 | 1/2003 | Beldycki | |
| 6,808,313 B1 | 10/2004 | Hung | |

* cited by examiner

*Primary Examiner*—Frank G Font
*Assistant Examiner*—Michael P Mooney
(74) *Attorney, Agent, or Firm*—Charles J. Prescott

(57) ABSTRACT

A ferrule connectable to a fiber optic cable having an exposed portion of a length of optical fiber extending from a protective buffer. The ferrule includes a cylindrical body including an optical fiber bore coaxial with the body which extends longitudinally from a proximal end of the body through a distal end portion thereof sized to slidably receive the optical fiber therethrough. The distal end portion is mechanically deformable to frictionally engage the optical fiber within the bore, the distal end being either conically shaped or including an outwardly extending ring resulting in the distal end being a substantially planar surface, whereby a projecting length of the optical fiber extending beyond the distal end may be cleaved in very close proximity to the distal end.

7 Claims, 13 Drawing Sheets

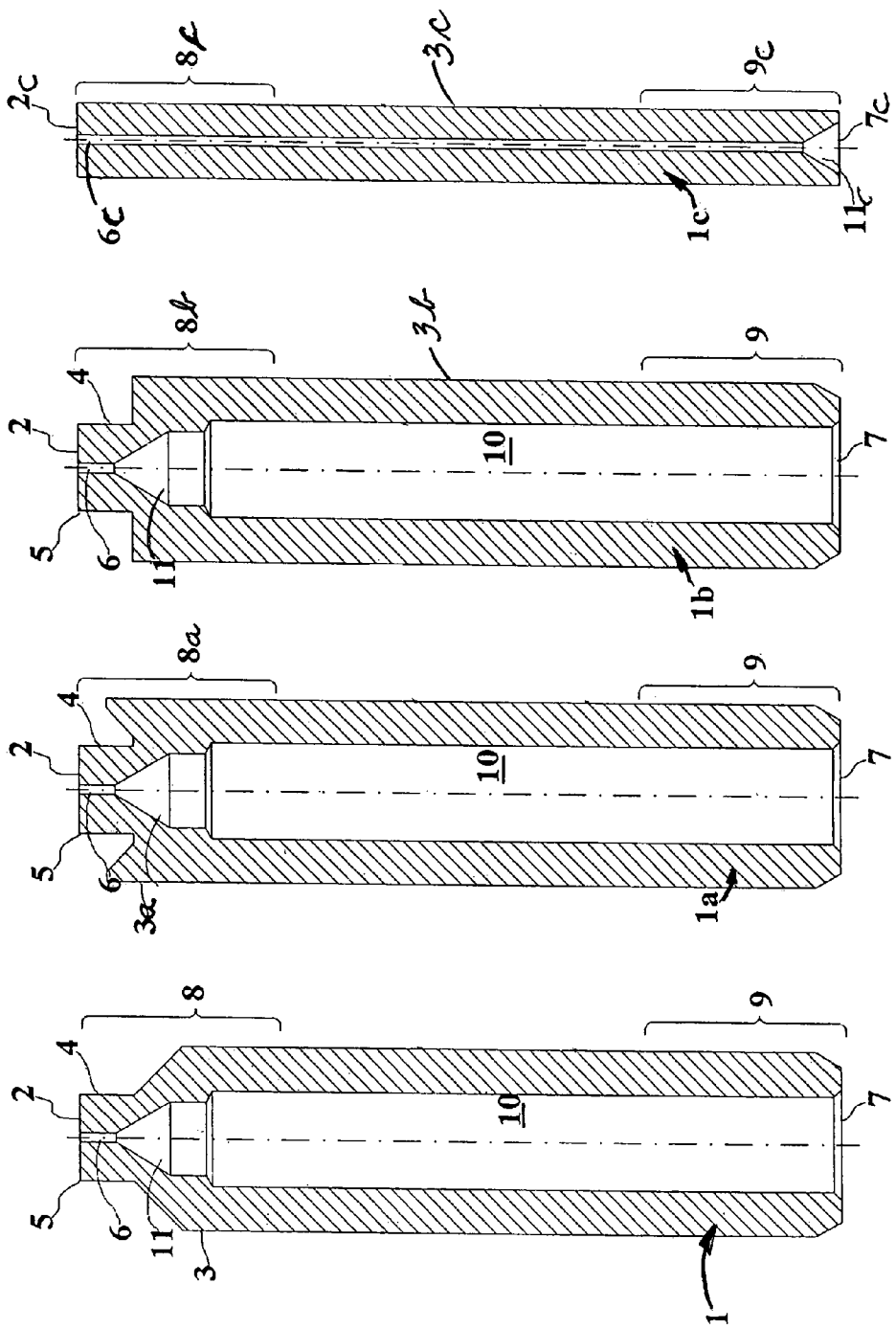

FIBER OPTIC FERRULE

CROSS-REFERENCE TO RELATED APPLICATIONS

This application is a continuation-in-part of application Ser. No. 11/593,828 filed Nov. 7, 2006.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates generally to fiber optic connectors and ferrules therefor and more particularly to an improved ferrule which minimizes subsequent end polishing required after the optical fiber has been mechanically secured within the ferrule.

2. Description of Related Art

Fiber optic cables are utilized for carrying various forms of signals in countless industrial installations, in equipment and in apparatus, and in consumer and commercial products of all types. Typically, each end of the optical fiber held within a deformable ferrule which is secured within a connector must be polished in a plane generally orthogonal to the length of the fiber optic cable for proper signal transmission to occur with a mating optical fiber element.

To accomplish the polishing of the end of the optical fiber, as well as to provide support structure to effect the mechanical engagement between fiber optic cable ends, the fiber optic connector such as that shown in FIGS. 7 and 8 of U.S. Pat. No. 5,305,406 invented by Rondeau and incorporated by reference includes a metallic or deformable ferrule or core 166 mechanically attached around the optical fiber 168 extending from the buffer 232. The ferrule 168 is secured within the surrounding connector 162 for additional stabilizing support of the ferrule 168. An additional metallic sleeve 230 is also provided to interconnect the distal portion of the buffer 232 and the proximal end of the ferrule 168 as best seen in FIG. 8 of the '406 patent.

Both the '406 patent and U.S. Pat. No. 6,510,271 invented by applicant herein, disclose apparatus and methodology to reduce the amount of projecting optical fiber which extends beyond the distal tip of the ferrule 168 and to minimize the amount of looseness or side clearance between the optical fiber and the distal end portion of the ferrule 168 after it has been mechanically crimped or swaged around the optical fiber to mechanically secure this relationship. Thereafter, a small amount of the projecting optical fiber and the distal end surface of the ferrule is typically polished substantially flat and orthogonal to the longitudinal axis of the ferrule so as to maximize the signal transmission between polished end surfaces of adjoining optical fiber connections. However, alternate polished distal tip ends such as radiused or tapered for specialized situations, are also used.

The current prior art is shown in FIGS. 1 to 11. Referring first to FIGS. 1 to 4, a number of metallic deformable ferrules which are used in conjunction with the method disclosed in the '406 patent are there shown generally at numerals 1, 1a, 1b and 1c. This type of ferrule has been utilized for a number of years in standard SMA, ST, SC, and FC connectors as well as in custom fiber optic connectors. These metallic ferrules are normally held at the rear or proximal end portion 9 and 9c to the body of a connector previously described in FIGS. 7 and 8 of the '406 patent. The connector itself forms no portion of the present invention and is being described for reference only.

Each of these ferrules 1, 1a and 1b include an elongated cylindrical body 3, 3a and 3b, respectively, each having a hollow cylindrical interior 10 open at a proximal end thereof to receive an end portion of the buffer or protective sheath around the optical fiber or optical fiber bundle. The exposed optical fiber is inserted through the proximal end 7 of the ferrule body and, with respect to the prior art ferrule embodiment of FIGS. 1 to 3, is passed through the cylindrical cavity 10 and is guided by tapered transitional region 11 into and through a longitudinal optical fiber bore 6 to extend longitudinally beyond the distal end 2.

With respect to the prior art embodiment 1c of FIG. 4, the optical fiber bore 6c extends longitudinally through almost the entire ferrule body 3c from the tapered transition 11a which also defines the proximal opening 7c of the proximal end portion 9c to the distal end 2c of the distal end portion 8c.

After the optical fiber 12 has been inserted through the optical fiber bore 6 as seen in FIG. 5 with the buffer 12a also inserted fully into the cylindrical interior 10, an impact forming or an impact swaging tool 13 having a truncated conical opening 16 defining a conical or tapered surface 14 and a longitudinal cylindrical bore 15 is brought together against the edge 5 of the distal end portion 8a, 8b or 8c of FIGS. 1 to 4, to mechanically deform the reduced diameter distal end portion 4 so as to mechanically crimp and frictionally engage the optical fiber 12 within the deformed bore 6' in FIG. 6. Note in FIG. 5 that the distal end 2 is initially flat and orthogonal with respect to the longitudinal axis and bore 6 of the ferrule 50 itself.

In FIG. 6, the tool 13 has been forcibly urged against the outer distal corner 5 of the now deformed distal end portion 4' so as to cause inward deformation of this region at 17 of the ferrule in compliance against the tapered surface 14. Several deformations occur during this impact swaging or impact forming operation, the first of which is that the outer corner 5 are severely deformed inwardly so as to at least partially collapse the bore 6' in the region 18. The deformable material of the ferrule at deformed surface 17 causes tightening around the optical fiber 12 in the region 18 to reduce and eliminate any clearance which has been pre-established by the sizing between the diameter of the optical fiber 12 and that of the undeformed bore 6, now 6' when deformed. Additionally, the previously flat distal end 2 has now taken a dish or crater configuration 19 with the distal end portion of the optical fiber 12 extending longitudinally therebeyond. Typically, the length of the optical fiber gripping region 18 is in the range of 0.2 mm, creating a frictional resistance to movement of the optical fiber 12 in the range of approximately 400 gms.

The depth of the concaved crater 19 as referenced in FIG. 7 is in the range of 0.1 mm and obviously will increase in proportion to the amount of force exerted by tool 13. The excess projection of the optical fiber 12 must be removed before the end polishing operation is commenced. To do this, typically the optical fiber 12 is cleaved at cutting line 20a in FIG. 7. However, the cleaving operation is typically only able to sever the optical fiber 12 in a range of approximately 0.05 mm at 20a from the edges of the crater 19. Thereafter, an end grinding and polishing operation must reduce the remaining exposed portion of the optical fiber 20a in FIG. 8. Manual cleaving or the use of a cleaving device such as that shown in the '271 patent may be utilized after the optical fiber 12 has been cleaved to establish distal end 2d. The projecting small portion of optical fiber 12, along with the crater 19 must be ground or sanded and polished down to the bottom of the crater at 21 to create preferably a substantially flat orthogonal surface as best seen in FIG. 11. During the grinding or sanding and polishing operation, a lateral force in the direction of the array of arrows shown in FIG. 10 is imposed along the gripping area 18 between the optical fiber 12 and the deformed bore 6'. As a result, the gripping force in gripping region 18 may be reduced by as much as 50% or more or even totally lost, rendering the ferrule unusable. Moreover, the overall length of this gripping region 18 may be reduced if excess material from the ferrule as well as the optical fiber 12 is removed inadvertently or carelessly during this polishing operation. The variables which affect the overall quality of this gripping force in this prior art arrangement are controlled by the impact of the swaging die process shown in FIG. 6, the reduced diameter of the deformable tip 4, and the angle of the conical surface 14 of the swaging tool 13.

BRIEF SUMMARY OF THE INVENTION

This invention is directed to a ferrule connectable to a fiber optic cable having an exposed portion of a length of optical fiber extending from a protective buffer. The ferrule includes an elongated cylindrical body having a substantially hollow longitudinally extending cylindrical interior open at a proximal end thereof adapted in size to receive an end portion of the buffer. An optical fiber bore coaxial with the hollow interior extends longitudinally through a distal end portion of the body sized to snugably slidably receive the optical fiber passing therethrough. The distal end portion is mechanically inwardly deformable to frictionally engage the optical fiber within the bore, the distal end being either conically shaped having a cone angle such that the distal end is also deformed into a substantially planar surface or the end portion including an outwardly extending ring whereby a projecting length of the optical fiber extending beyond the distal end may be cleaved in very close proximity to the distal end.

It is therefore an object of this invention to provide a fiber optic ferrule with enhanced optical fiber retention characteristics.

Yet another object of this invention to provide a ferrule which substantially reduces the cost of the after-assembly polishing process of the end of the ferrule/optical fiber end configuration.

Still another object of this invention is to provide a fiber optic ferrule which, by design choice, facilitates selected location of the mechanical gripping force region for enhanced optical fiber retention within the ferrule.

Yet another object of this invention is to provide a fiber optic ferrule which is substantially less impervious to loosening of the optical fiber after mechanical assembly thereof to the ferrule during final end polishing operations.

And another object of this invention is to provide a fiber optic ferrule which, when mechanically deformed to establish permanent connection with an optical fiber therewithin, substantially reduces the projected length of the optical fiber remaining for polishing removal after cleaving of the excess optical fiber from the distal end of the assembly.

In accordance with these and other objects which will become apparent hereinafter, the instant invention will now be described with reference to the accompanying drawings.

BRIEF DESCRIPTION OF THE SEVERAL VIEWS OF THE DRAWING(S)

Prior Art

FIGS. 1 to 4 are longitudinal section views of typical metallic deformable prior ferrules for use in conjunction with a fiber optic cable.

The Instant Invention

Figure 5:
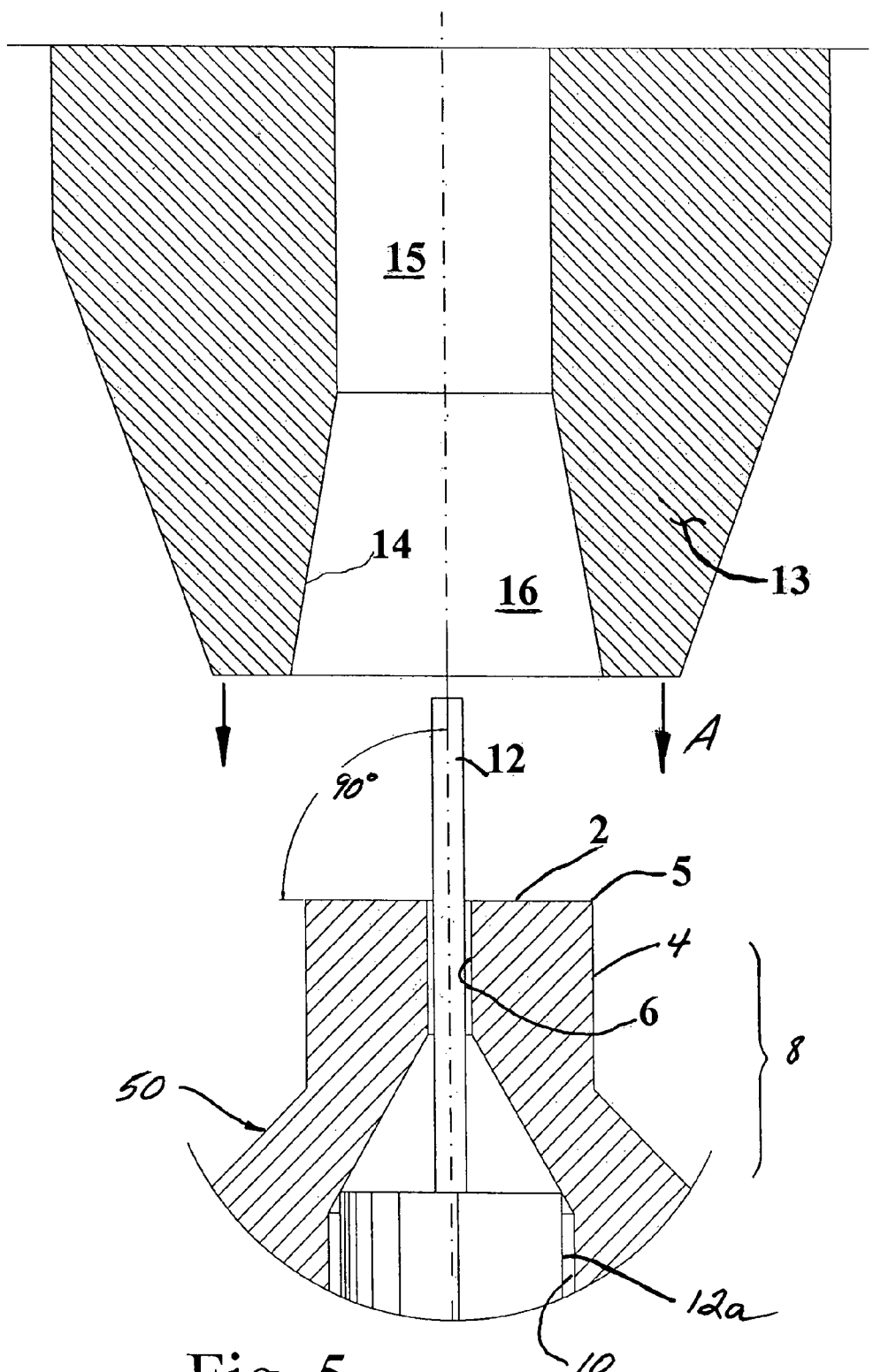
FIG. 5 is an enlarged exploded view of the distal portion of the prior art ferrule embodiment of FIG. 1 in relation to an impact deforming or swaging tool.
Figure 6:
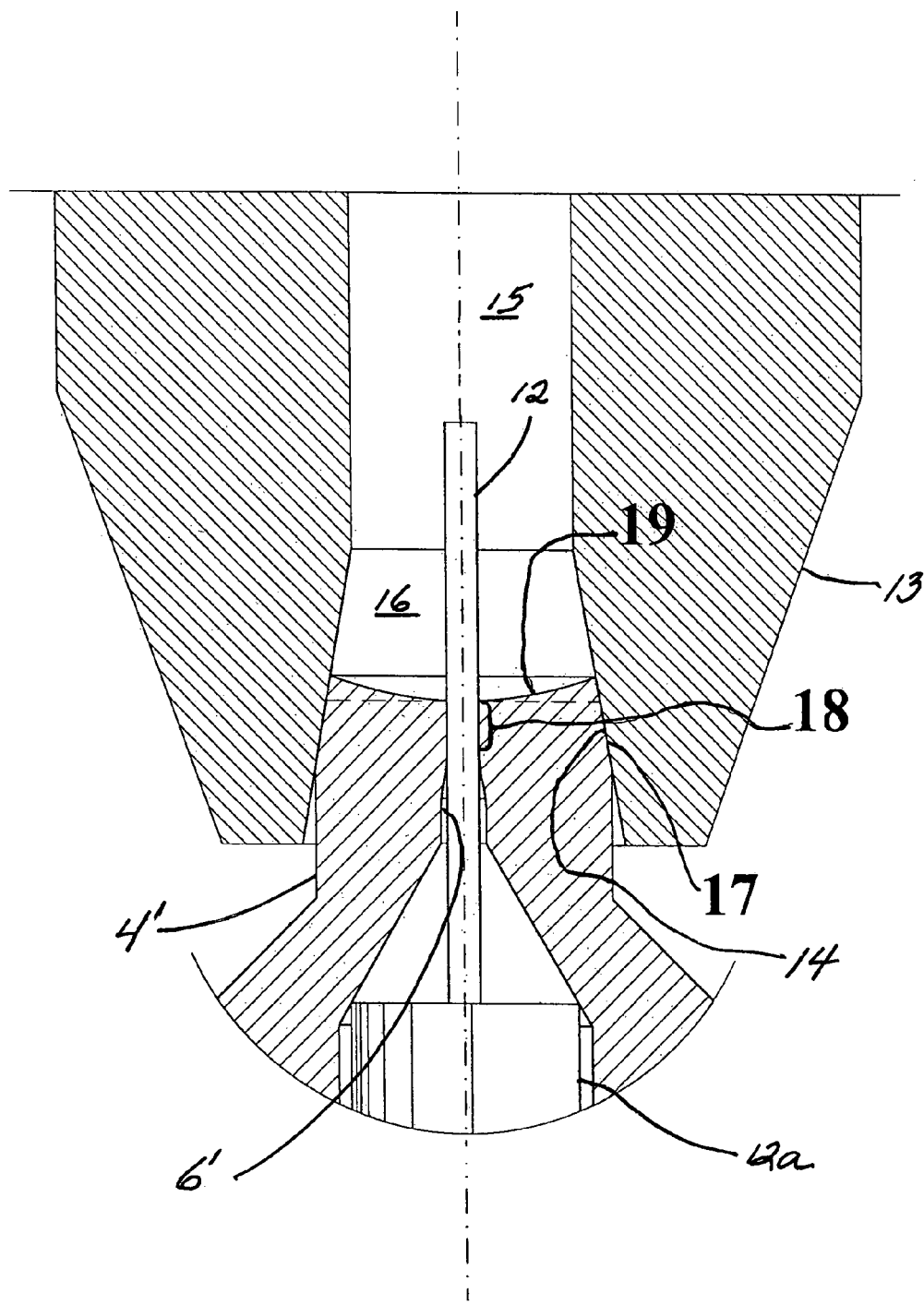
FIG. 6 is a view of FIG. 5 showing the tool after deforming impact with the distal end of the prior art ferrule.
Figure 7:
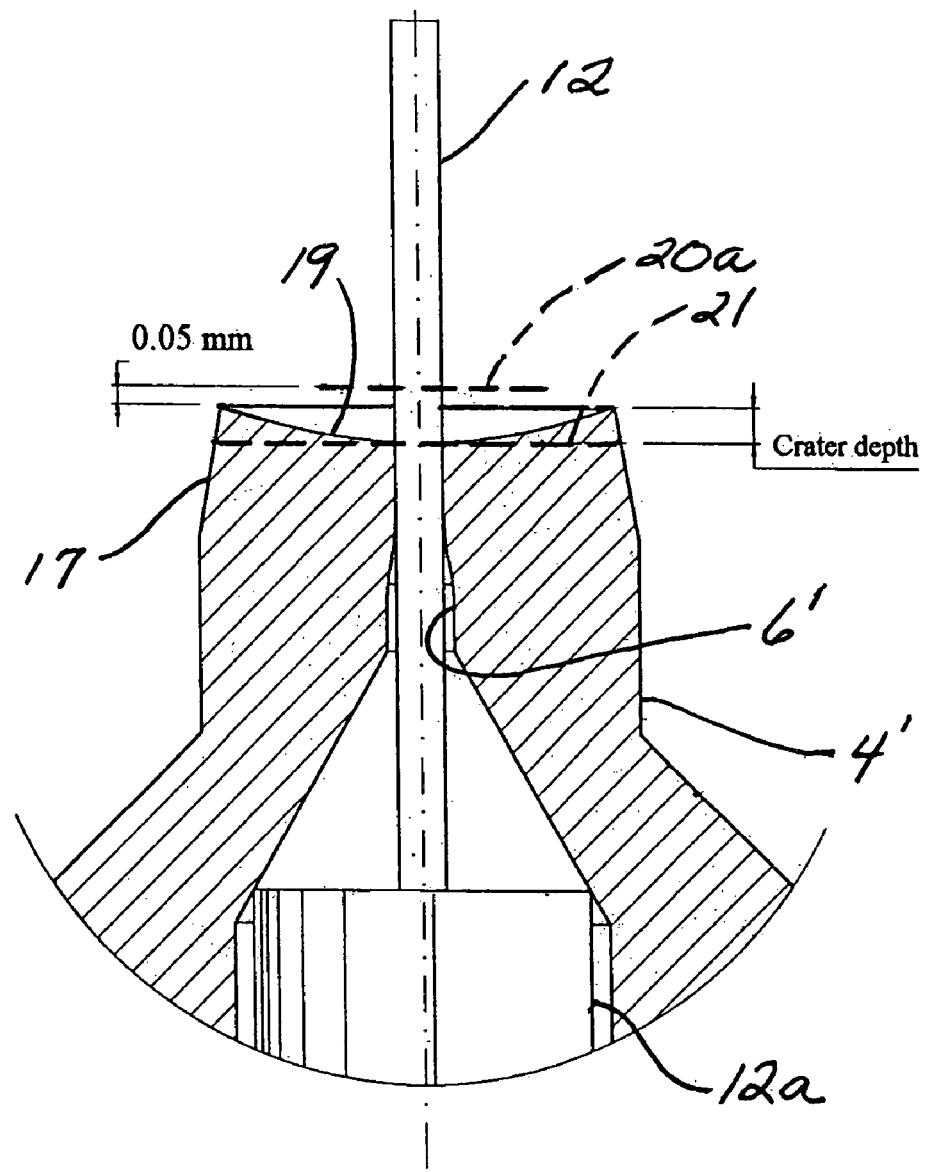
FIG. 7 is a view of FIG. 6 with the tool removed.
Figure 8:
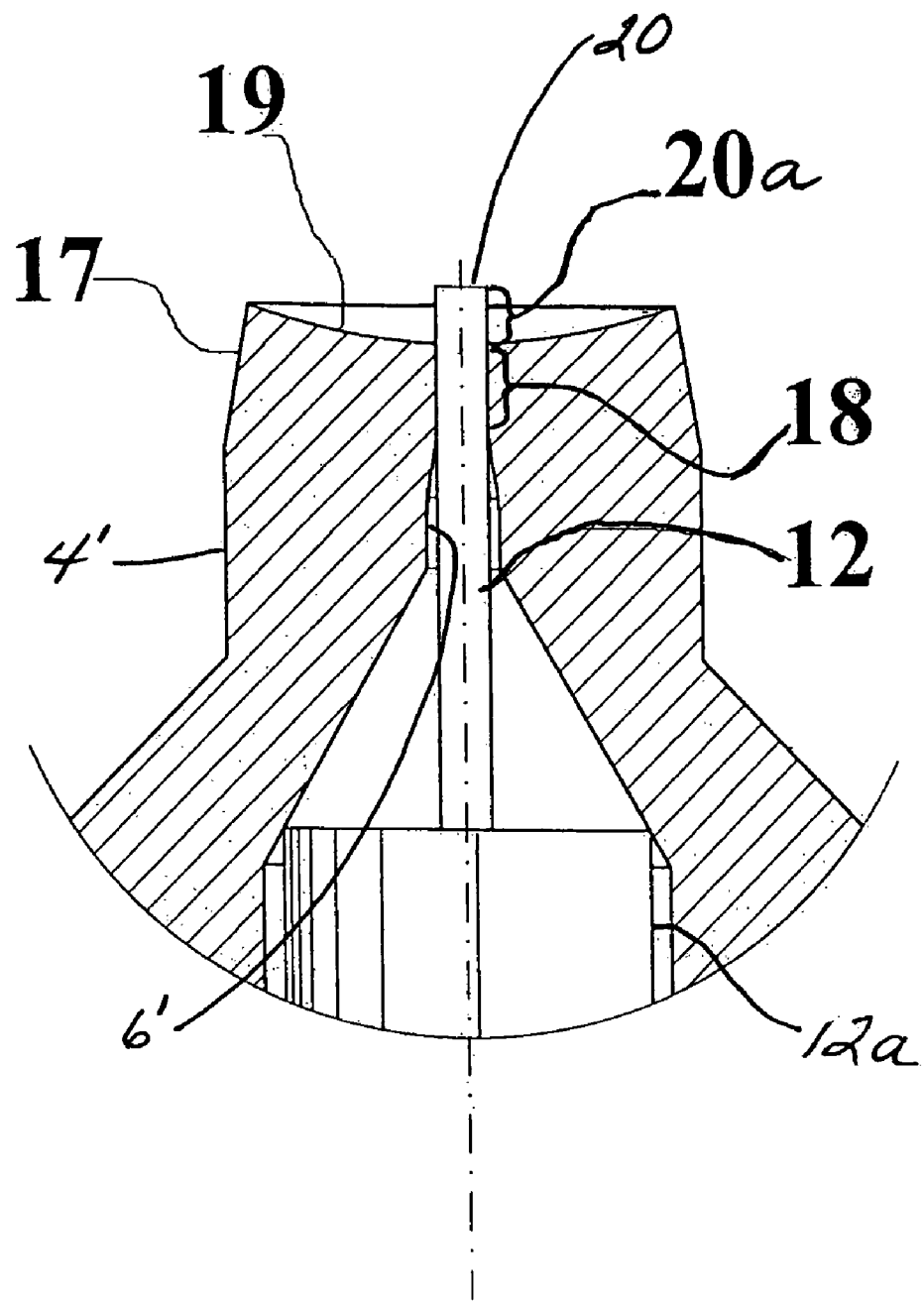
FIG. 8 is a view of FIG. 7 after cleavage of the projected distal portion of the optical fiber.
Figure 9:
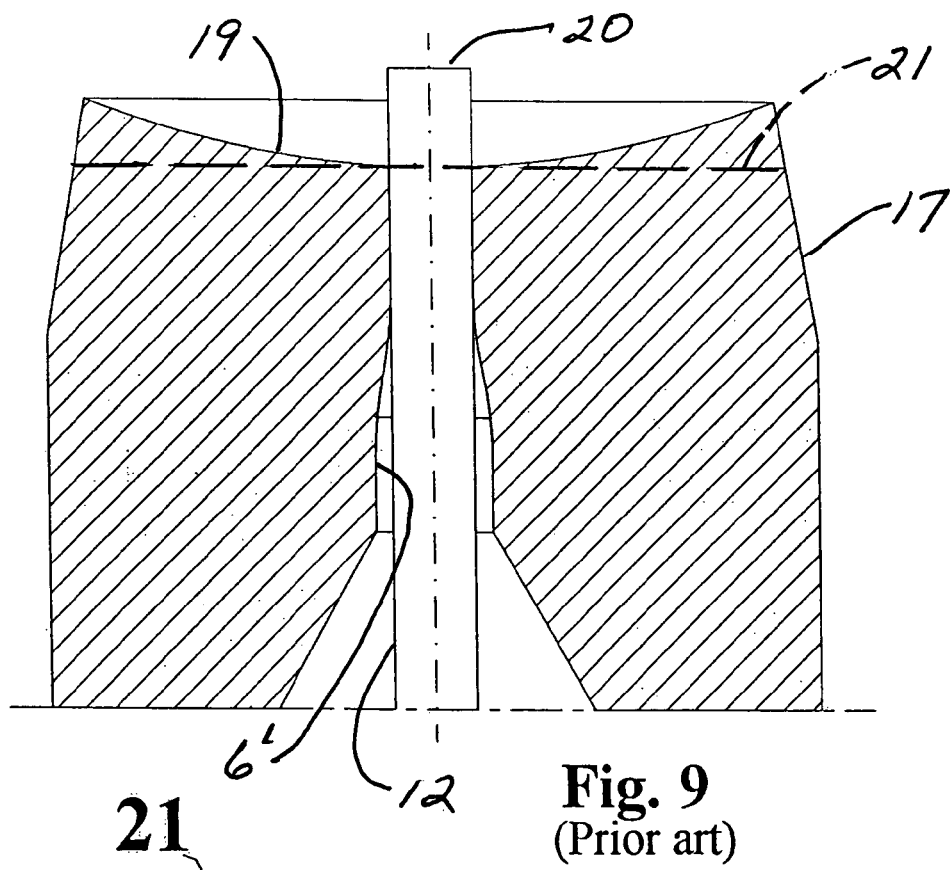
FIG. 9 is an enlarged view of the distal end portion of FIG. 8.
Figure 11:
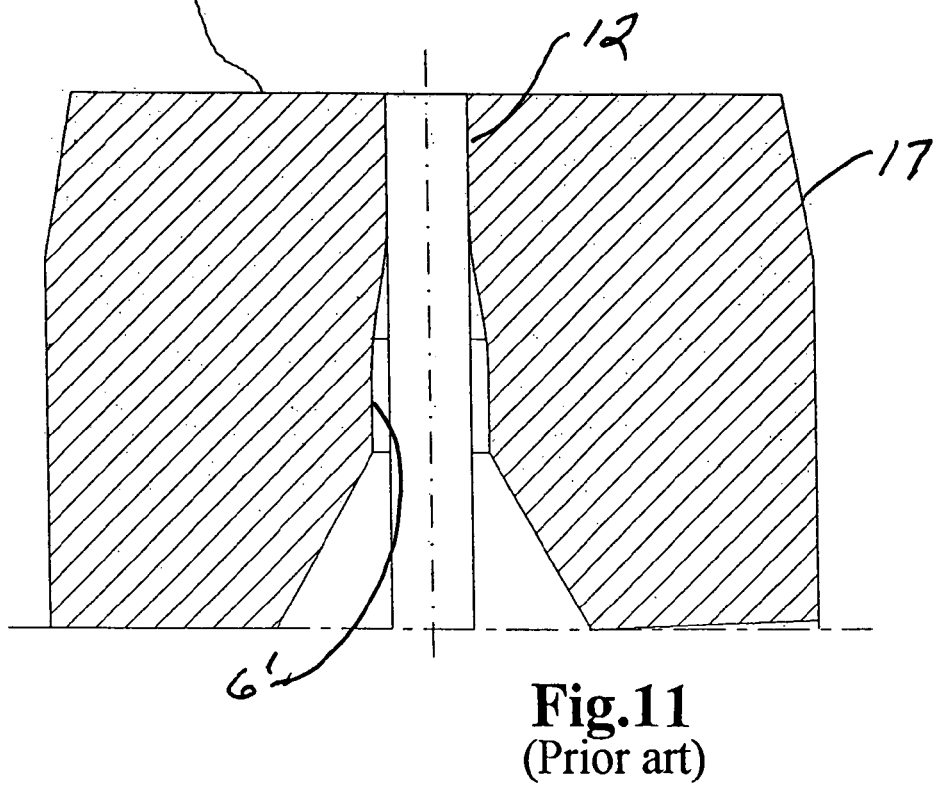
FIG. 11 is a view of FIG. 9 after polishing of the distal end thereof has been accomplished.
Figure 10:
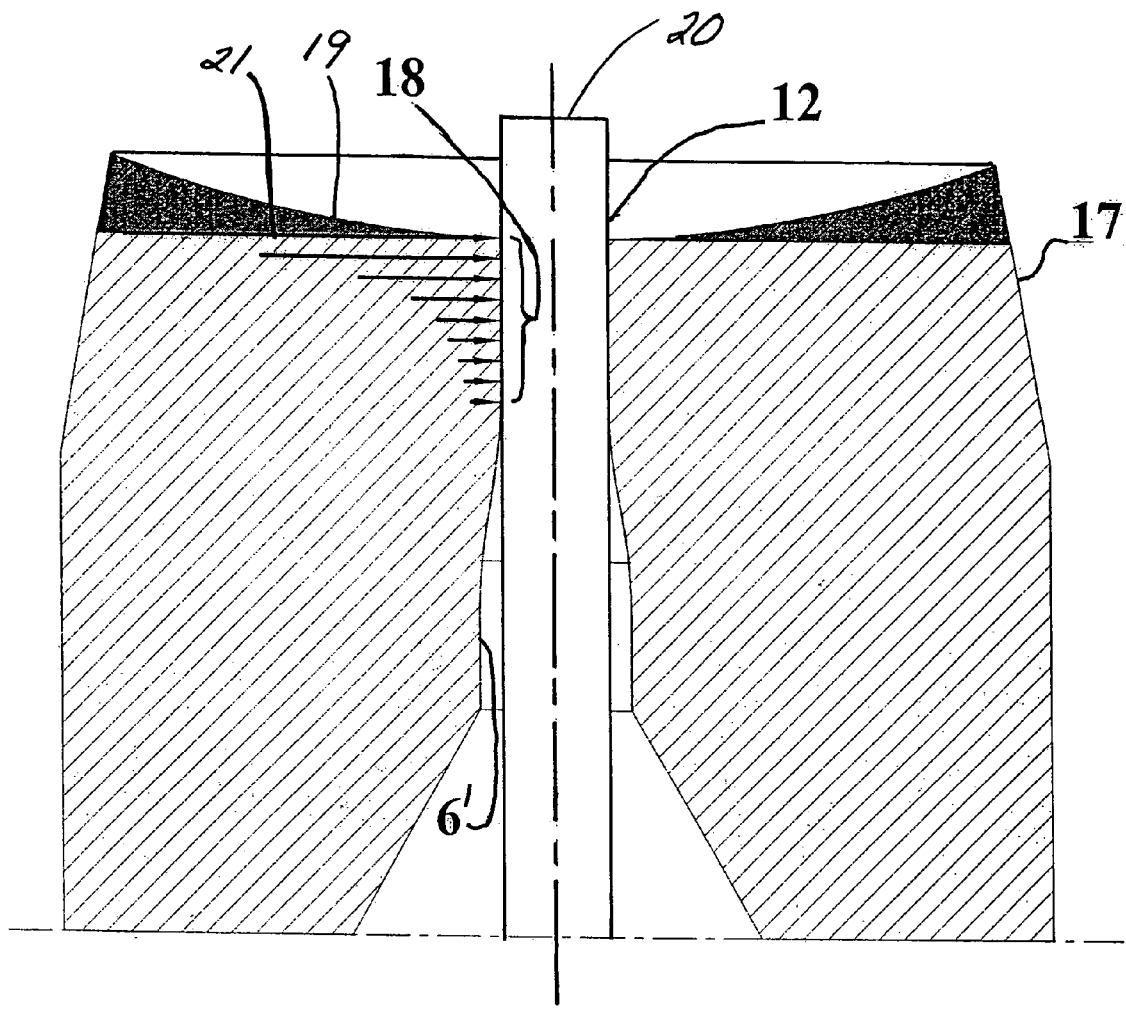
FIG. 10 is a further enlarged view of FIG. 9 showing the ferrule material required to be removed as shaded.
Figure 12:
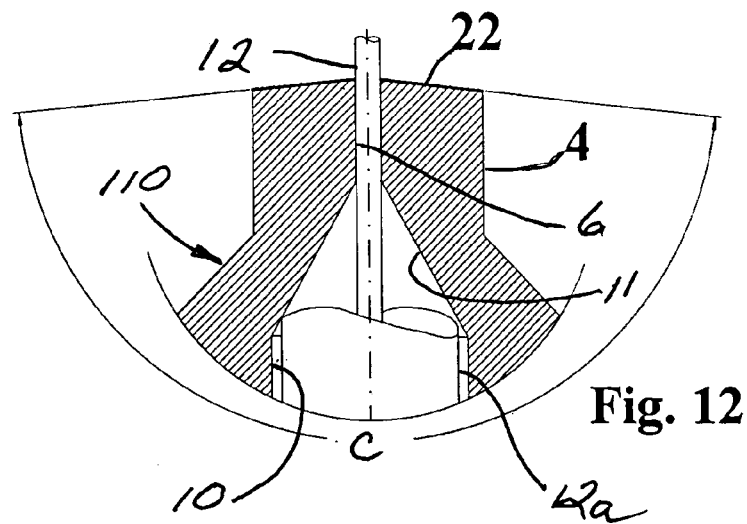

FIG. 12 is an enlarged section view of a distal end portion of one embodiment of the ferrule of the present invention with the fiber optic cable in place ready for assembly.

Figure 13:
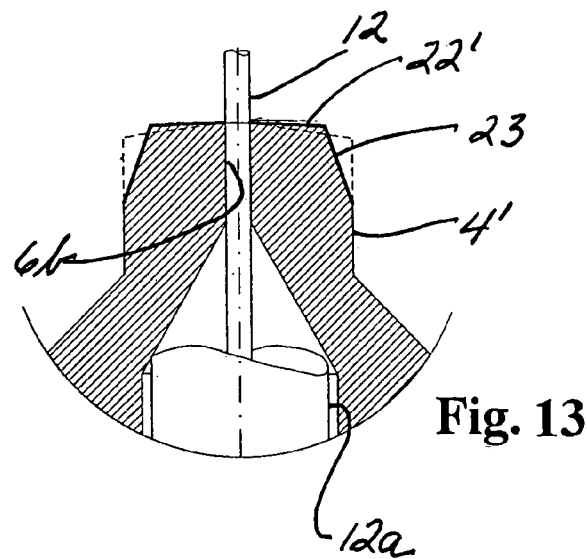

FIG. 13 is a view of FIG. 12 after mechanical deformation of the distal tip portion around the optical fiber.

Figure 14:
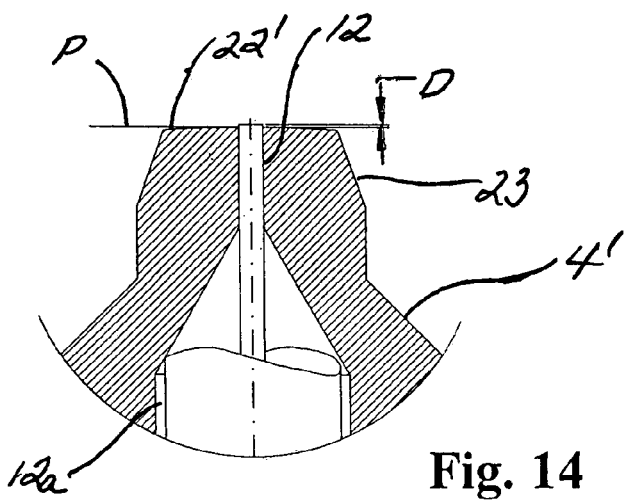

FIG. 14 is a view of FIG. 13 after cleavage of the projecting portion of the optical fiber beyond the distal end of the ferrule.

Figure 15:
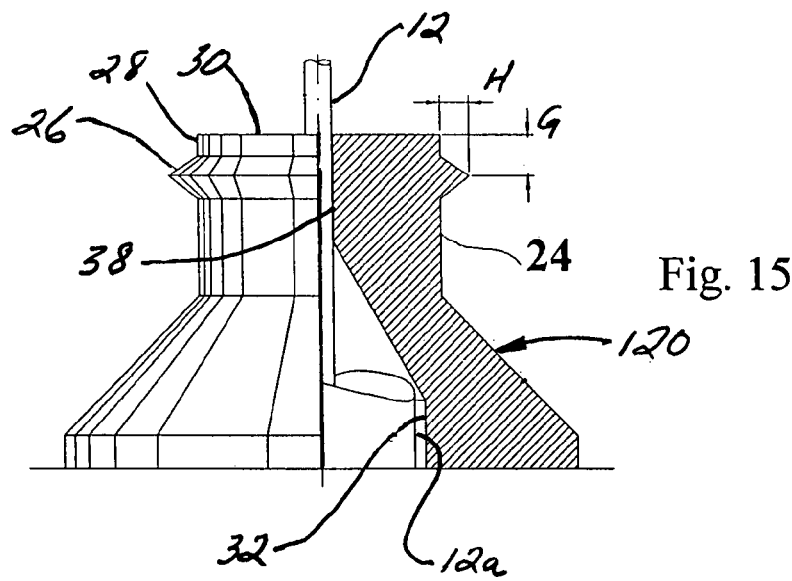

FIG. 15 is an enlarged partial section view of the distal tip portion of another embodiment of the invention with the optical fiber cable in position prior to assembly.

Figure 16:
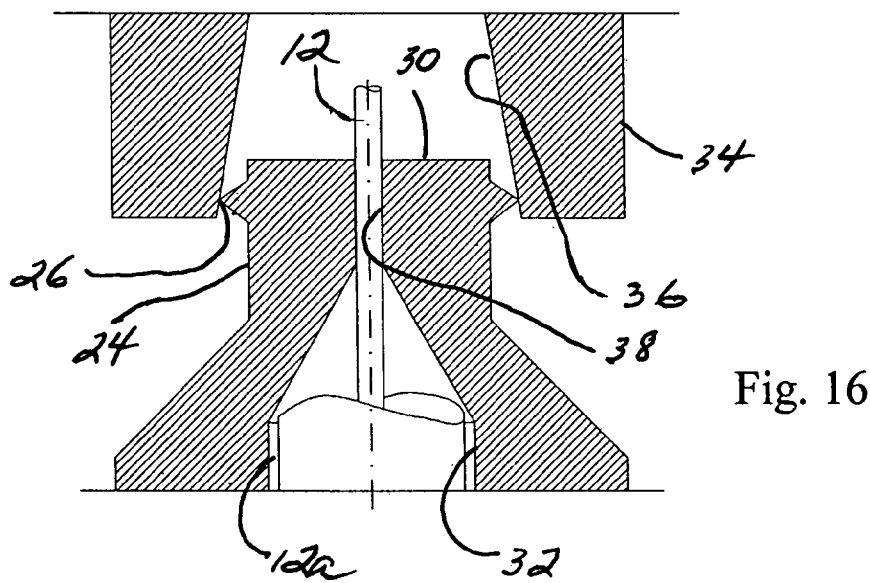

FIG. 16 is a view of FIG. 15 showing the deforming tool at the point of impact with an outwardly laterally projecting ring or bead formed as a part of the distal tip portion.

Figure 17:
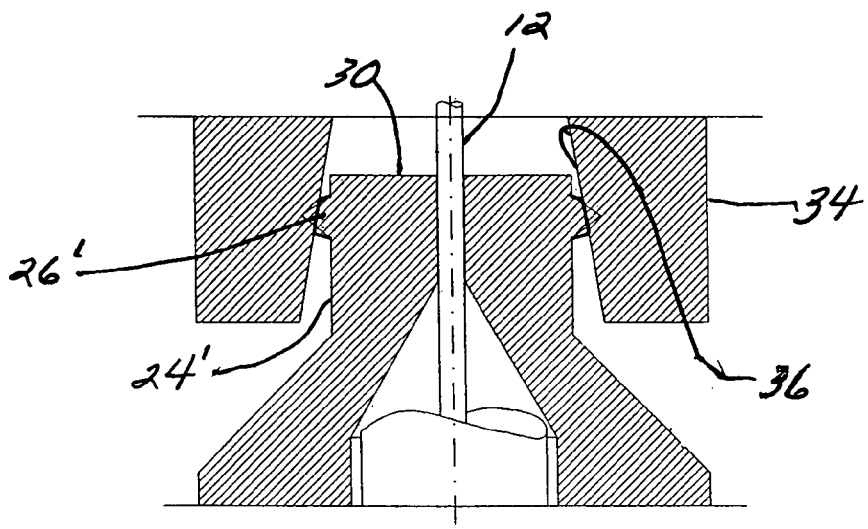

FIG. 17 is a view of FIG. 16 at the maximum impact of the deforming tool against the distal end portion of the ferrule.

Figure 18:
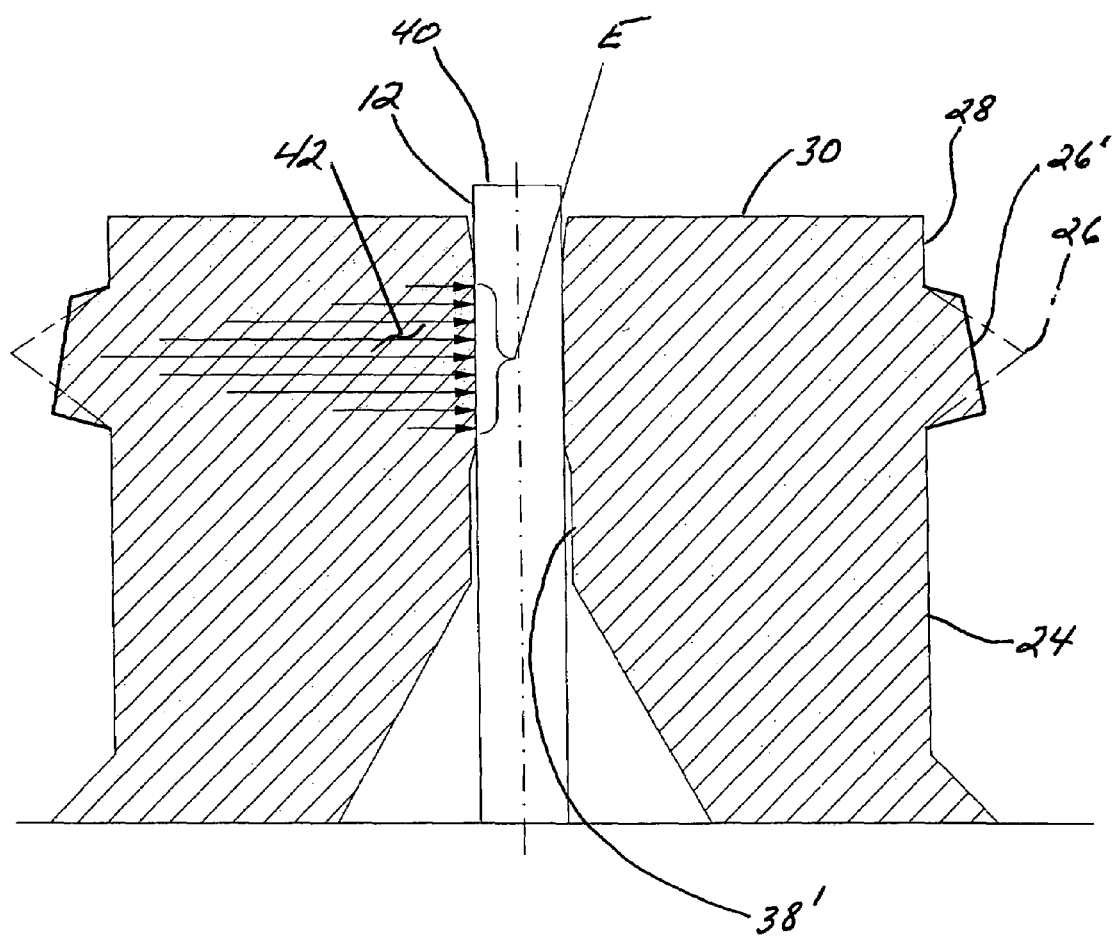

FIG. 18 is an enlarged view of the deformed ferrule and optical fiber of FIG. 17.

Figure 19A:
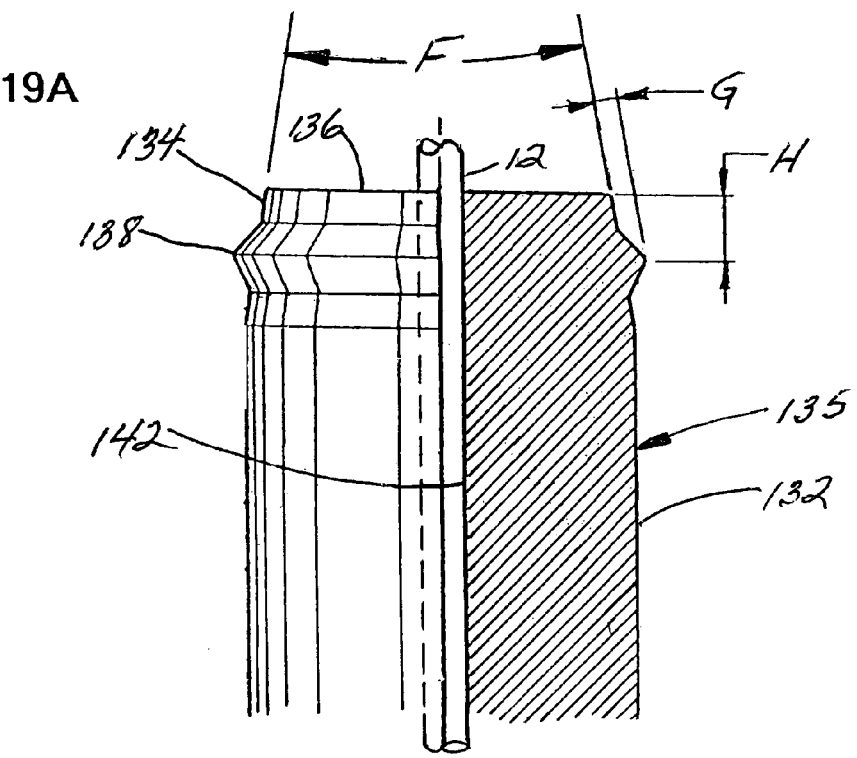
Figure 19:
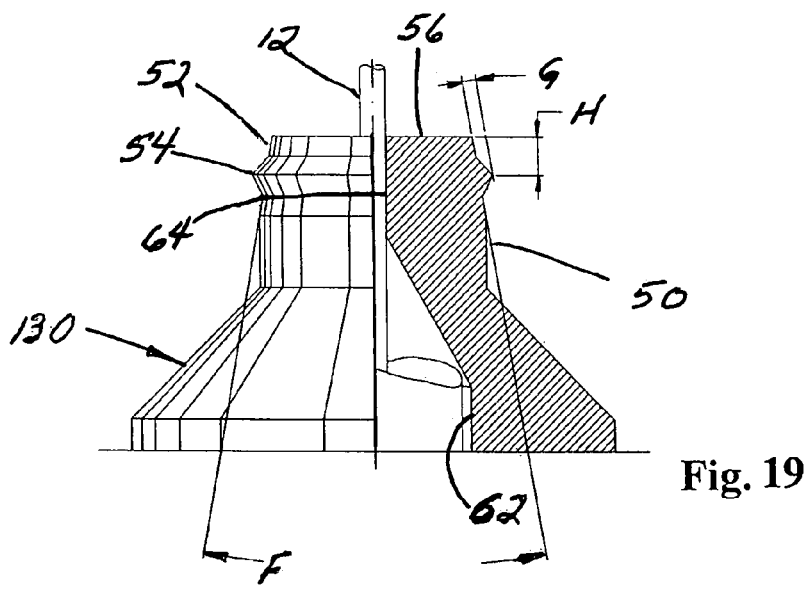

FIG. 19 is a view similar to FIG. 15 of still another embodiment of the invention.

Figure 12A:
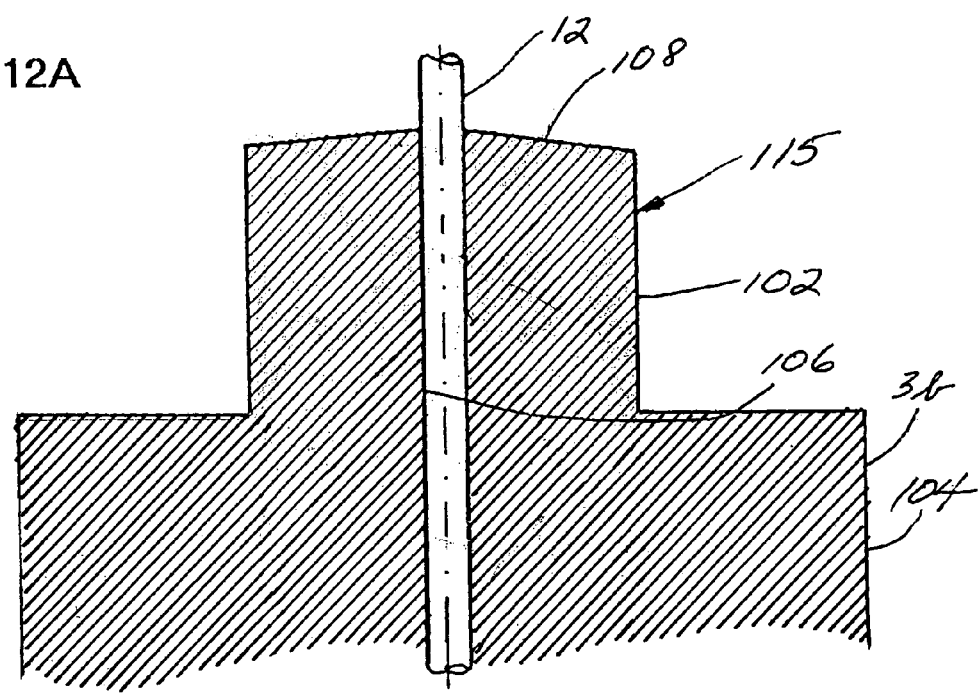

FIG. 12A is an alternate embodiment of FIG. 12

FIG. 19A is an alternate embodiment of FIG. 19.

Figure 20:
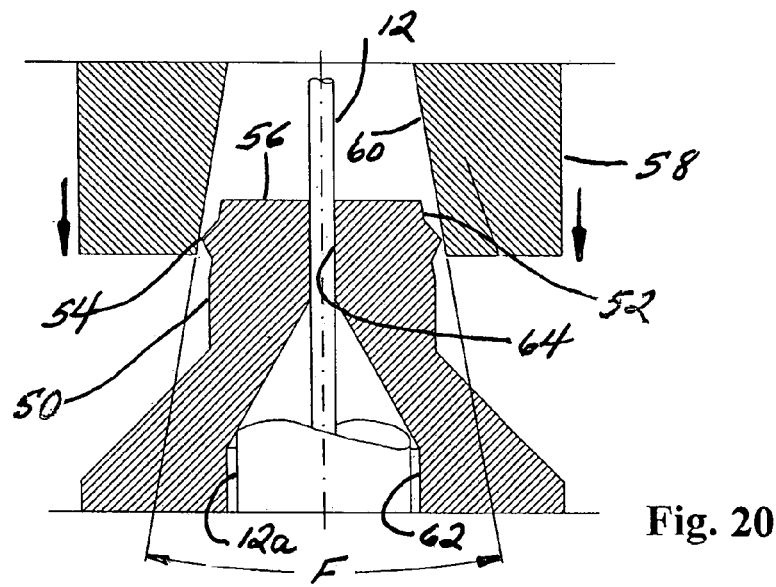

FIG. 20 is a section view similar to FIG. 19 showing the deforming tool at the point of impact with an outwardly laterally projecting annular ring or bead formed as a part of the distal tip portion.

Figure 21:
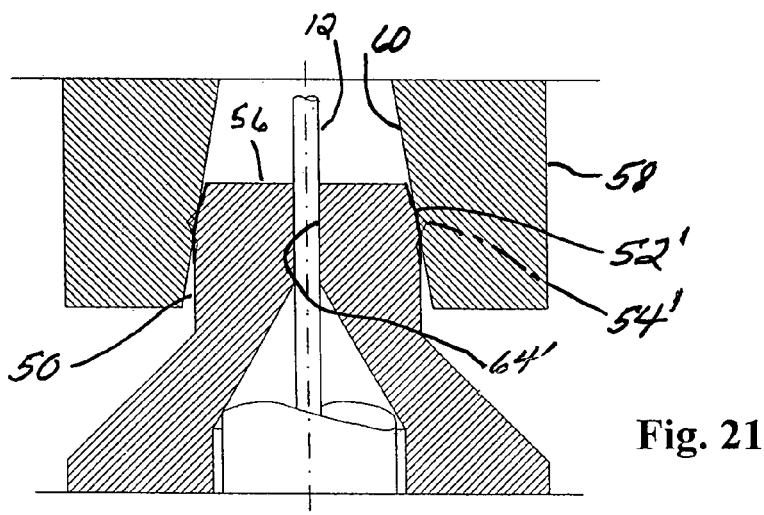

FIG. 21 is a section view of FIG. 20 at the maximum impact of the deforming tool against the distal end portion of the ferrule.

Figure 22:
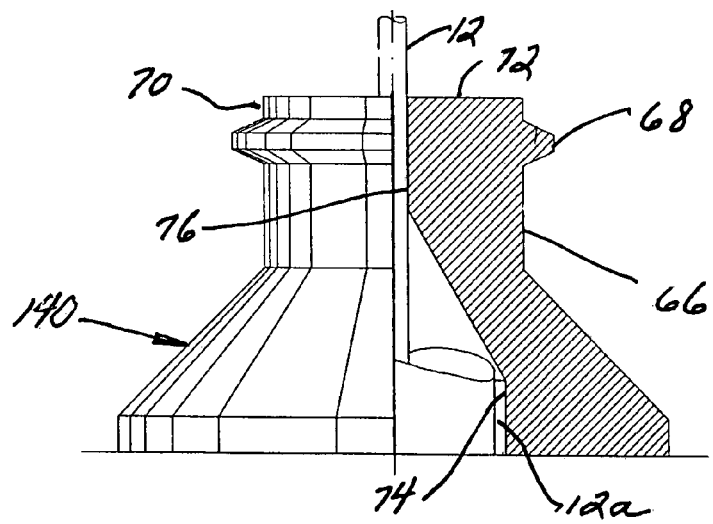

FIG. 22 is a view similar to FIG. 15 of still another embodiment of the invention.

Figure 23:
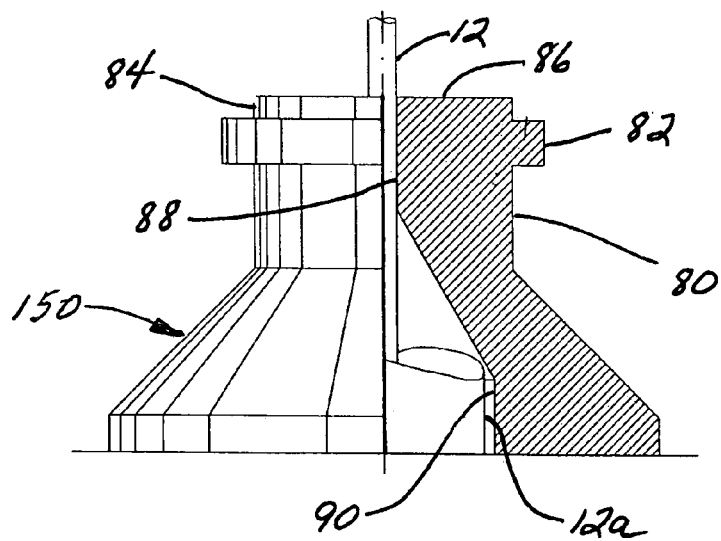

FIG. 23 is a view similar to FIG. 15 showing yet another embodiment of the invention.

Figure 24:
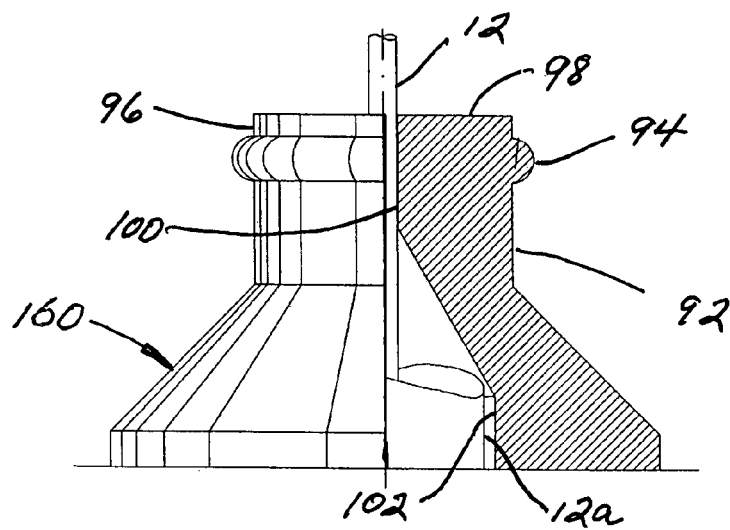

FIG. 24 is a view similar to FIG. 15 showing yet another embodiment of the invention.

DETAILED DESCRIPTION OF THE INVENTION

Referring now to FIGS. 12 to 14, the preferred embodiment of the invention is there shown generally at numeral 110. This ferrule 110 includes the elongated cylindrical body having the hollow cylindrical interior 10 similar to the previously described conventional deformable ferrules. This embodiment 110 includes the reduced-in-diameter distal end portion 4 having a longitudinally extending optical fiber bore 6b adapted in size to slidably receive the optical fiber 12 which extends beyond the buffer 12a or the protective sheath of the fiber optic cable. This embodiment 110 also includes a tapered transition zone 11 which greatly enhances guiding of the distal tip of the optical fiber 12 into and through the optical fiber bore 6b.

The distal end 22 of the ferrule 110 is uniquely configured initially as will be described with respect to FIGS. 13 and 14 having a very broad non-flat conical configuration with a cone angle C generally equal to in the range of 170°-179°, preferably 174°. As seen in FIG. 13, after the mechanical deformation of the distal corners 23 by the utilization of the deforming tool (not shown as repetitive) against the undeformed distal end portion 4, the distal corners 23 thus inwardly deform into a tapered truncated cone matching the deforming conical surface of the deforming tool so that the deformable bore tightly binds against the optical fiber 12 and in a manner which leaves the distal end 22' as nearly a flat surface. Then, as seen in FIG. 14, the cleaving of the protruding portion of the optical fiber 12 is easily accomplished in very close proximity to the distal end 22', leaving only a very small exposed optical fiber segment D in the range of just a few micrometers from the substantially flat distal end 22'. Thereafter, polishing for maximum signal transmission from cable to cable is easily and quickly accomplished.

Referring now to FIG. 12A, an alternate embodiment of that shown in FIG. 12 is there shown generally at numeral 115. In this embodiment 115, the first variation of shoulders of the reduced diameter distal end portion 102 are similar to that described in FIG. 3 at 3b. Further, this embodiment which also includes longitudinal bore 6 as previously described for receiving the optical fiber 12, continues concentrically through the entire cylindrical body 104 absent the transition 11 and hollow cylindrical interior 10. By this structure, only the optical fiber 12 extends through the entire cylindrical body 104.

This embodiment 115 again includes the reduced in diameter distal end portion 102 and the very broad non-flat conical configuration of the distal end 108 as previously described with respect to FIG. 12.

Referring now to FIGS. 15 to 17, another embodiment of the invention is there shown generally at numeral 120 and, again, this improved ferrule 120 includes the elongated body (not shown) which defines the hollow cylindrical interior 32 for receiving the buffer 12a, the protruding length of optical fiber 12 inserted through the longitudinally extending optical fiber bore 38 in a fashion as previously described.

To accomplish the two-fold objectives of the present invention, i.e., (a) end up with a substantially flat distal end surface 30 after the deformation of the reduced-in-size distal end portion 24 which (b) tightly secures the optical fiber 12 within the bore 38, a triangular in section outwardly extending preferably annular ring or band 26 is provided formed preferably as an integral part of the reduced-in-size distal end portion 28 of the ferrule 120. Once the buffer 12a and the optical fiber 12 are inserted into the ferrule 120 as shown in FIG. 16, the deforming tool 34 with its conically tapered surface 36 is impacted against these triangular rings 26 which radially inwardly deform as shown in FIG. 17.

As better seen in FIG. 15, the undeformed triangular band 26 have an outwardly extending dimension H and an offset from the distal end 30 of G. By this arrangement as seen in FIG. 18, an inwardly exerted force distribution E in the direction of arrows 42 clampingly engage around the cylindrical optical fiber 12 at a spacing from the distal end 30 selected by dimension G. Likewise, the degree of compression or retention force 42 exerted to securely retain the optical fiber 12 in the deformed bore 38' as determined by the outward protrusion H of the triangular ring 26 may easily be varied to accomplish a desired level of optical fiber retention.

Once the deformation of these triangular ring 26 into the configuration 26' shown in FIGS. 17 and 18 is accomplished, cleavage of the protruding portion of the optical fiber 12 is accomplished at 40 in very close proximity to the flat distal end 30, leaving only a minimal amount of polishing of the end surface 40, the distal end 30 remaining substantially flat and orthogonally oriented to the longitudinal axis of the ferrule itself.

It is here noted that the diameter of the bore 38 is generally selected to be slightly larger than the outside diameter of the optical fiber 12 to allow sliding translation installation therebetween and to allow for the bore deformation to occur into the configuration shown in FIG. 18.

Another embodiment of the invention is shown at numeral 130 in FIGS. 19 to 21. In this ferrule embodiment 130, the distal end portion 50 includes a tapered portion 52 and a triangular laterally or radially outwardly extending annular ring 54 positioned on the tapered portion 52 which is established at a conical angle F of preferably less than 30° or more preferably in the range of about 20°.

This conical angle F generally is equal to the taper 60 of the deforming tool 58 so as to provide an even more uniform inward deformation of the ring 54 as seen in FIG. 21. The deformed triangular ring 54' and the slightly compressed tapered portion 52' greatly enhance the strength of retention of the optical fiber 12 within the compressed and deformed bore 64' around the optical fiber 12. As in previous embodiment 120, this embodiment 130 also leaves the distal end 56 in a substantially flattened configuration and orthogonally oriented to the longitudinal axis of the ferrule 120 thus facilitating close cleavage of the protruding portion of the optical fiber 12 and requiring minimal polishing thereafter for maximum signal transmission.

Referring now to FIG. 19A, an alternate embodiment of 130 is there shown generally at 135. In this embodiment 135, substantially all of the structure and description with respect to FIG. 19 is reiterated except that the main cylindrical body 132 is of a diameter substantially equal to that of the beginning diameter of taper 135. A cylindrical bore 142 designed and configured to slidably receive the optical fiber 12 entirely therethrough is provided in this embodiment 135 and, as with respect to embodiment 130 in FIG. 19, the distal end 136 is in a substantially flattened configuration and orthogonally oriented with respect to the longitudinal axis of the main body 132 thus facilitating close cleavage of the protruding portion of the optical fiber 12.

Three additional embodiments of the radially outwardly extending annular ring concept of the invention are shown in FIGS. 22, 23 and 24. In FIG. 22, this embodiment 140 includes trapezoidally configured radially outwardly extending ring 68 integrally formed with the cylindrical reduced-in-diameter distal portion 66. The smaller length 70 of the distal portion 66 positioned between the ring 68 and the distal end 72 of the ferrule 140 is preselected in longitudinal position so that a desired distribution and location of clamping forces of bore 76 as described in FIG. 18 against the optical fiber 12 is accomplished. As in previous embodiments, the buffer 12a is provided for within the hollow cylindrical interior 74.

In FIG. 23, this embodiment 150 includes an orthogonally configured radially outwardly extending ring 82 formed as a part of the reduced-in-diameter distal portion 80, a small amount of which at 84 is provided to achieve a particularly desired clamping location and distribution against the optical fiber 12 when inward deformation of the bore 88 distal end portion and the ring 82 is accomplished. The cylindrical hollow interior 90, again, accommodates the buffer 12a.

Lastly, in FIG. 24, a semi-circular in cross section annular ring 94 is provided which outwardly extends from the distal portion 92 leaving a small distal portion 96 spaced from the distal end 98. The optical fiber 12 extends through the longitudinal bore 100 as previously described in sliding fashion so that the deformation of the ring 94 will collapse the bore 100 slightly, resulting in the desired degree and tightness distribution of the clamping forces for optical fiber retention.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

The invention claimed is:

1. A ferrule connectable to a fiber optic cable having an exposed portion of a length of optical fiber extending from a protective buffer, comprising:
   an elongated cylindrical body including a cylindrical optical fiber bore coaxial extending longitudinally and coaxially through said body and being sized to slidably receive the optical fiber passing therethrough;
   a distal end portion of said body tapering from that of a main portion of said body and including a radially outwardly extending ring, said distal end portion being mechanically inwardly deformable against said ring to frictionally engage said optical fiber within said bore, said distal end remaining substantially as a planar surface transversely oriented to a longitudinal axis of said body wherein a projecting length of the optical fiber extending beyond said distal end may be cleaved in close proximity to said distal end.

2. A ferrule as set forth in claim 1, wherein:
   an outer surface of said body is substantially straight over an entire length thereof from said proximal end to said tapering distal end portion.

3. A ferrule as set forth in claim 1, wherein:
   said distal end portion is reduced in outer diameter from that of said main portion.

4. A ferrule as set forth in claim 3, further comprising:
   a tapered hollow transition coaxial with a proximal end of said optical fiber bore, the optical fiber being guided by said transition into said bore.

5. A ferrule connectable to a fiber optic cable having an exposed portion of a length of optical fiber extending from a protective buffer, comprising:
   an elongated cylindrical body including a cylindrical optical fiber bore coaxial extending longitudinally and coaxially through a distal end portion of said body and being sized to slidably receive the optical fiber passing through;
   a radially outwardly extending ring formed on or attached to an outer surface of said distal end portion, said distal end portion being mechanically inwardly deformable against said ring to frictionally engage said optical fiber within said bore, said distal end remaining substantially as a planar surface transversely oriented to a longitudinal axis of said body wherein a projecting length of the optical fiber extending beyond said distal end may be cleaved in close proximity to said distal end.

6. A ferrule as set forth in claim 5, wherein:
   said distal end portion is reduced in outer diameter from that of said main portion.

7. A ferrule as set forth in claim 5, wherein:
   an outer surface of said body is substantially straight over an entire length thereof from said proximal end to said tapering distal end portion.

* * * * *